United States Patent [19]

Jacoby

[11] 4,038,443
[45] July 26, 1977

[54] DUST ENTRAPMENT COMPOSITION AND METHOD THEREFOR

[75] Inventor: Charles H. Jacoby, Dalton, Pa.

[73] Assignee: Akzona Incorporated, Asheville, N.C.

[21] Appl. No.: 573,701

[22] Filed: May 1, 1975

Related U.S. Application Data

[62] Division of Ser. No. 337,964, March 5, 1973, Pat. No. 3,896,039.

[51] Int. Cl.$^2$ .................................................. B05C 1/16
[52] U.S. Cl. .................................... 427/136; 427/140; 427/343; 427/419 R; 252/88
[58] Field of Search ........... 427/343, 136, 140, 419 R; 252/88

[56] References Cited

U.S. PATENT DOCUMENTS

| | | | |
|---|---|---|---|
| 873,913 | 12/1907 | Vernon et al. | 252/88 |
| 3,709,712 | 1/1973 | Rossman | 427/142 |

Primary Examiner—Ronald H. Smith
Assistant Examiner—Janyce A. Bell
Attorney, Agent, or Firm—Francis W. Young; Tom R. Vestal

[57] ABSTRACT

The present invention relates to improvements in binding dust particles such as coal dust in mining operations by coating exposed surfaces in mine workings with a dust binding agent. Additives to the binding agent enhance dust entrapment and may be coated on the exposed surfaces after an initial layer of binding agent has been structured in the mine workings.

4 Claims, No Drawings

DUST ENTRAPMENT COMPOSITION AND METHOD THEREFOR

This is a division of application Ser. No. 337,964, filed Mar. 5, 1973 and now U.S. Pat. No. 3,896,039.

Dust particles floating in air in an underground mine working constitute a nuisance to mining operations. In the instance of combustible dust particles, combustion of the particles resulting in an explosion is a constant hazard, and numerous proposals have been made to reduce or eliminate the hazard. The present approach authorized for reducing the explosion hazard is to add rock dust in the mine working to inhibit coal dust combustion and absorb heat energy which may be released by the ignition of the combustible dust particles. This addition of rock dust adds to the unpleasantness of the mining operation as well as being a health hazard. The dust can cause silicosis or pneumoconiosis in workers exposed to the dust for long periods of time.

An alternative to rock dusting has been known for quite some time. This alternative embodies the coating of exposed surfaces in a mine working with a dust entrapment agent. An early embodiment can be found in the U.S. Pat. No. 995,261, in which a hygroscopic, pappy mass was made in such a consistancy that it could be thrown on the walls by means of compressed air apparatus. Later disclosures, such as U.S. Pat. No. 2,786,815, teach the incorporation of non-ionic surfactants to the wall coating substance to reduce fluid surface tension in the coating for increased dust entrapment capabilities.

Even though the wall coating system has an apparent advantage over the rock dusting technique, it has not been accepted by the mining industry because of side effects of the process and its relative ineffectiveness unless properly utilized. The materials used in preparing the wall coating substance often have a corrosive effect on mining machinery. Experience has also shown the difficulty in balancing the desired properties of the wall coating substrate, and compromises in these properties have lessened the overall effectiveness of the coating.

The present invention proposes to overcome the earlier objections to the wall coating process by the use of additives at various stages of the surface coating forming process, in contrast to the prior teaching of one step coating. An advantage has been found in placing a first layer coating on mine surface walls to produce a satisfactory bonding surface, followed by a second layer of wall coating having maximum dust entrapment capability.

It has now been determined that a surface coating consisting of a salt paste with a modified crystalline structure has maximum dust entrapment capability due to the characteristic flaky, branchlike crystalline surfaces it presents to the dust laden atmosphere. Examples of these structures are dendritic and acicular crystalline structures. This crystalline structure is, however, inherently weak and not sufficiently capable of supporting itself adequately in a surface crust as required in mining operations.

It has also been found that a mixture of NaCl of the common cubic crystalline structure and certain clays in a salt paste has very good binding qualities on surfaces such as found in mine workings. The adding of clays to the mixture also increases the strength of the coating on the surface to make it more supportive. Bentonite and attapulgite clays have proven to be the effective clays in preparing the salt paste in view of their moisture retaining properties. It has been surprisingly found that attapulgite clays increase the recrystallization of the salt paste in high humidities. This mixture does not have the dust entrapment capabilities of the dendritic structure discussed above, however.

In the present invention, a first layer comprising NaCl, (attapulgite or bentonite) clay, and water in a paste solution is placed on the walls, ceiling and exposed beams. The mixture is placed in such a manner that a crust is formed on the wall surface. The mixture may be placed on the wall in a number of known ways. Spraying the paste on the wall with conventional gunite machines is the preferred method, however.

Additives to the first layer such as sodium nitrite or sodium dichromate may be used as a corrosion inhibitor. Surface active agents may also be employed. Although prior art teaching indicates non-ionic surfactants should be utilized, it has surprisingly been discovered that a more dust receptive crust surface may be formed if the use is made of anionic surfactants in the paste in a percentage of 0.01 to 0.05% with maximum effectiveness occurring when 0.02 - 0.03% anionic surfactant is incorporated in the paste.

The first layer may be allowed to accumulate dust for a period of time before application of the second layer. The use of an anionic surfactant such as dioctyl ester of sodium succinic acid (made commercially under the name of Aerosol OT - 75% by American Cyanimid) is helpful in forming a crust having better entrapment characteristics than non-treated salt crusts. Of lesser, but still increased effectiveness are cationic surfactants similar to Ethomeen S/25 and Ethomeen T/15, tertiary amine ethylene oxide condensation products of primary fatty amines manufactured by the Armak Company.

The second layer containing a dendritic crystal forming salt paste may be added to increase the dust entrapment capabilities of the first paste layer. A preferred method of preparing this paste is to add a water soluble complex iron cyanide selected from the group consisting of alkali metal ferrocyanide salts, alkaline earth metal ferricyanide salts, alkali metal ferricyanide salts and alkaline earth metal ferricyanide salts to salt paste similar to the first layer paste. The addition of the complex iron cyanide tends to modify the crystal structure growth of NaCl into a dendritic form. This paste containing the complex iron cyanide may be applied in a light coat over the first layer using similar spreading techniques.

As is known in the prior art, the salt crust formed in mine workings must be rewetted at intervals to regenerate its dust entrapment capability. It is thought the rewetting is needed to urge previously trapped dust particles further into the interstices of the salt crust and further to enhance formation of salt crystals on the surface of the crust to cover existing dust particles and present new capture surfaces for the particles.

The present invention utilizes a brine solution to regenerate the crust formed in the mine workings. The advantage in using a brine solution over the prior teaching of using water are threefold. Water sprayed on an existing crust must dissolve the crust until the water has become salt saturated. The crust may become substantially weakened and crumble or run if too much water is sprayed on the surface. The spraying with a saturated brine solution substantially eliminates the dissolving of the prior crust. Furthermore, the brine solution may begin the evaporation and crystal forming process on the salt crust immediately. The salt contained in the solution adds to the strength of the crust after the solution has evaporated. The brine may also be formulated as required under the local conditions in the mine working to effectively control the corrosion rate within the working and enhance crystalline growth of the already formed salt crust.

Thirdly, it is known that weak saline solutions are more corrosive than saturated brine solutions. For example, it has been shown that a 5 percent saline solution is four times as corrosive as a thirty percent saline solution on mild steel. Also, salt mining has shown little corrosive problems in machinery exposed to 100% saline conditions.

The second layer of salt crust of the present invention may be formed with advantage by spraying a saturated brine solution containing a complex iron cyanide. The crystals so formed upon evaporation of the brine solution will be largely dendritic in nature. Heating the brine solution in the presence of additional sodium chloride crystals before spraying gives the added advantage of introducing additional sodium chloride into the crust, further enhancing the strength of the crust and dust entrapping characteristics.

It has also been determined that minimum amounts of a deliquescent substance such as magnesium or calcium chloride can be used to advantage to maintain sufficient moisture content in the salt crust to create a condition for crystal growth. The deliquescent may be added in the original salt paste in minimal amounts sufficient to prevent running of the salt paste on the gallery walls - normally 2% or less of the paste condition. The regenerating solution may also carry proportionate amounts of the deliquescent.

The clays added in the first layer should not exceed 10% of the total mixture in order to present an acceptable dust entrapment surface. It has been found that attapulgite and bentonite clays in the amount of 2.5% to 7% of the first layer mixture are quite acceptable for this purpose. The preferred percentage of clay in the first layer is 4 to 5%, however.

It has been found that a number of additives previously discussed serve a dual purpose as a corrosion inhibitor also, for example, sodium ferrocyanide acts both as a dendritic crystal forming additive and a corrosion inhibitor. Similarly, Ethomeen S/15 (a tertiary amine and condensation product of primary fatty acid marketed by the Armak Company) acts as a surface active agent and corrosion inhibitor. Other examples of corrosion inhibitors are zinc sulphate, borax, disodium phosphate, and ammonium salts of amido-poly-phosphate.

EXAMPLE I

A salt paste mixture containing 81% sodium chloride, 15% $H_2O$, and 4% bentonite clay was spread on a simulated mine surface in an atmosphere containing a relative humidity of 85%. The salt acted as a coagulant for the bentonite clay and the mixture quickly obtained sufficient structure to cling to the surface and become self-supportive. Crystalline growth structure was observed for a period of 7 days without rewetting. The surface structure formed was uneven, but generally smooth.

EXAMPLE II

A salt paste mixture similar to Example I was prepared; but with the addition of 0.02% anionic surfactant Aerosol OT - 75%. The surface structure resembled Example I, but additional salt crystal aggregates "mushroomed" through the surface and formed greater dust entrapment surfaces.

EXAMPLE III

The salt crust of Example I was sprayed generally with a saturated brine solution containing 13 ppm of sodium ferrocyanide. The surface crystalline growth structure was of a dendritic structure with high dust entrapment characteristics.

What is claimed is:

1. The method of entrapping dust particles in a mine working comprising coating the mine working surfaces with a first mixture consisting essentially of sodium chloride, clay and water to form a crust; then coating the formed crust with a second mixture consisting essentially of sodium chloride, water and a water soluble complex iron cyanide selected from the group consisting of alkali metal ferrocyanide salts, alkaline earth metal ferrocyanide salts, alkali metal ferricyanide salts, and alkaline earth metal ferricyanide salts.

2. The method of claim 1 wherein the second coating mixture is a brine solution mixture containing the water soluble complex iron cyanide.

3. The method of claim 2 further comprising the step of heating said brine solution before coating the crust in the presence of sufficient sodium chloride crystals to form a saturated brine solution at an above-ambient temperature.

4. The method of regenerating an already formed salt crust formed in a mine working comprising the step of spraying the salt crust with a saturated brine solution heated to an above-ambient temperature.

* * * * *